E. WEERTS.
AGRICULTURAL IMPLEMENT.
APPLICATION FILED MAR. 31, 1908.
915,814.
Patented Mar. 23, 1909.
2 SHEETS—SHEET 1.
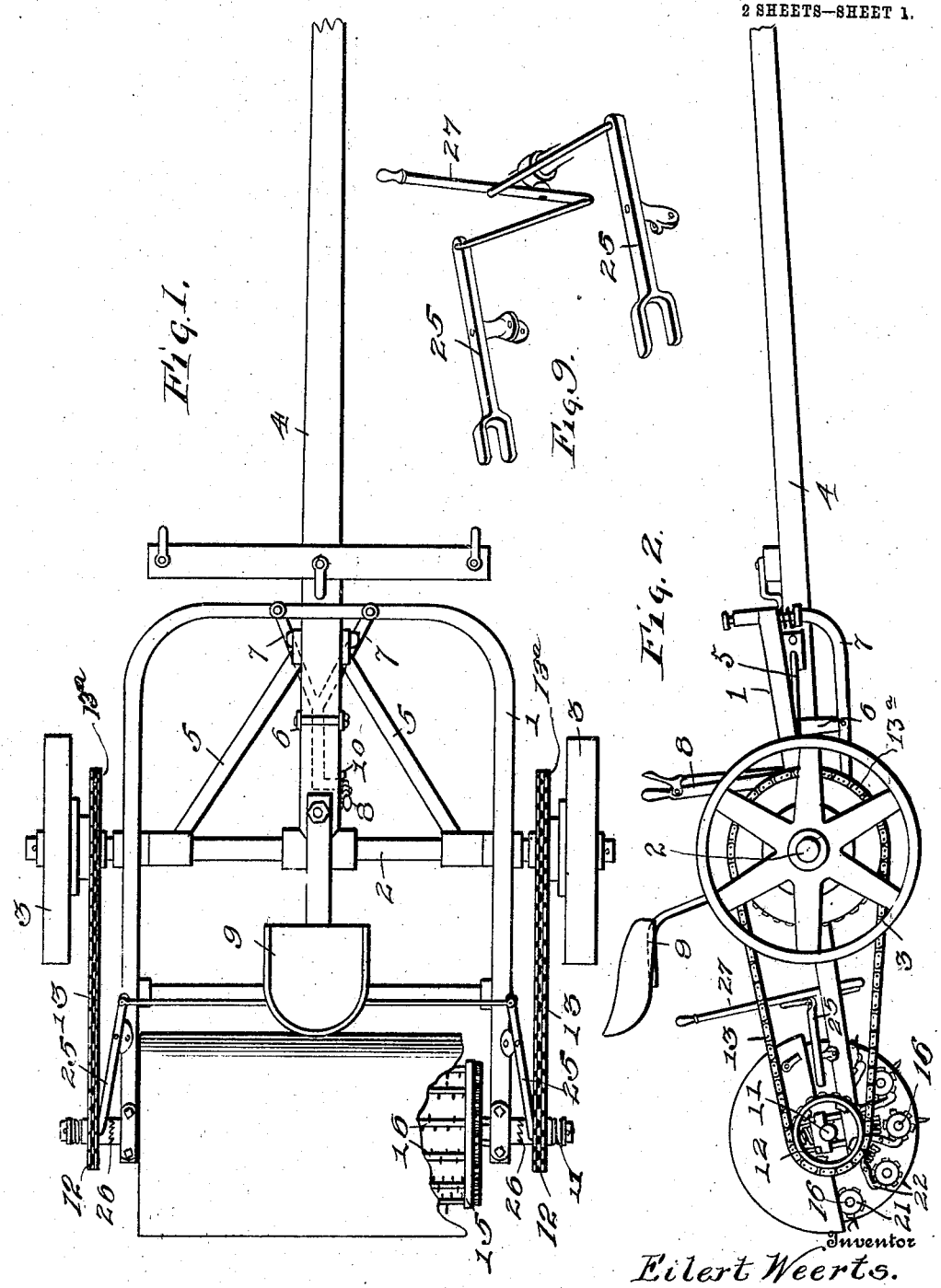
Witnesses
Inventor
Eilert Weerts.
By Head & Lacey, Attorneys E. WEERTS.
AGRICULTURAL IMPLEMENT.
APPLICATION FILED MAR. 31, 1908.
915,814.
Patented Mar. 23, 1909.
2 SHEETS—SHEET 2.
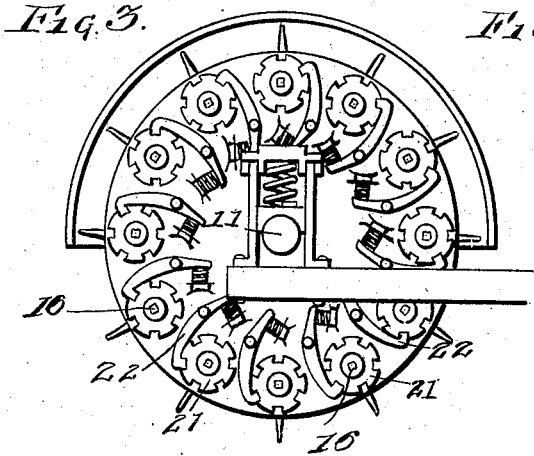
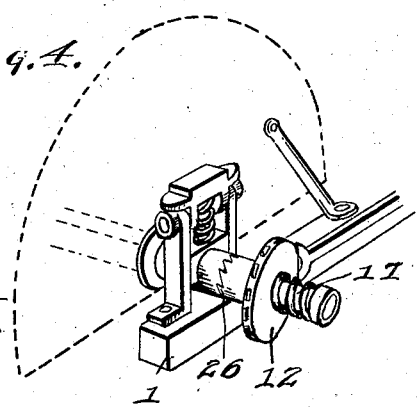
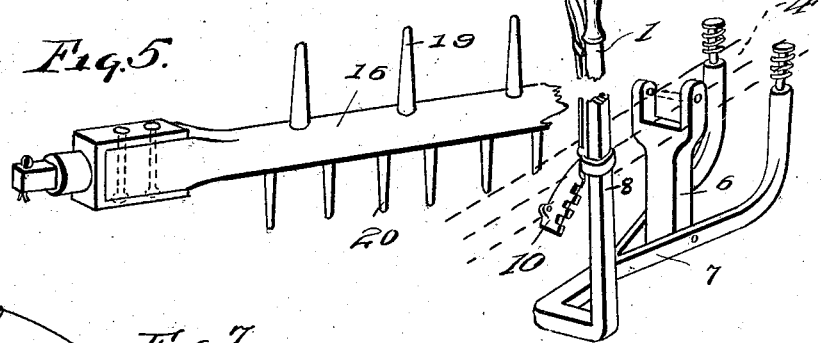
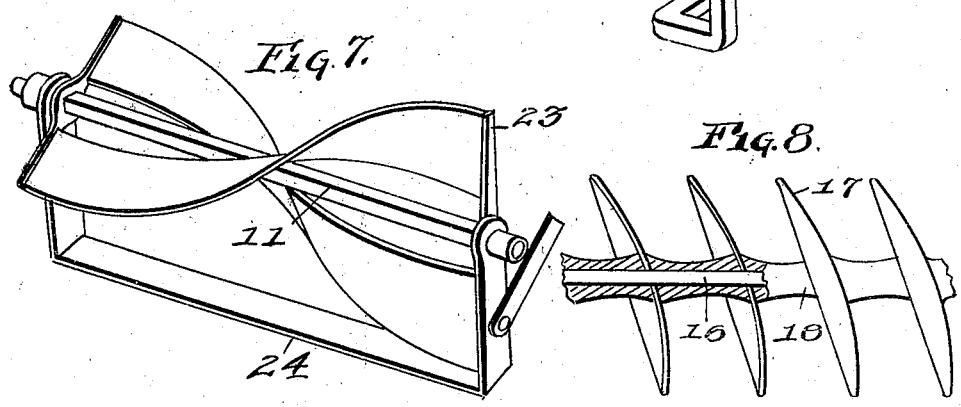
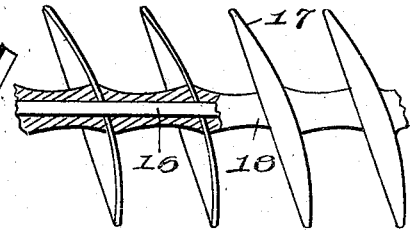
Inventor
Eilert Weerts

UNITED STATES PATENT OFFICE.

EILERT WEERTS, OF WENTWORTH, SOUTH DAKOTA.

AGRICULTURAL IMPLEMENT.

No. 915,814.	Specification of Letters Patent.	Patented March 23, 1909.

Application filed March 31, 1908. Serial No. 424,428.

*To all whom it may concern:*

Be it known that I, EILERT WEERTS, citizen of the United States, residing at Wentworth, in the county of Lake and State of South Dakota, have invented certain new and useful Improvements in Agricultural Implements, of which the following is a specification.

The present invention has relation to an agricultural implement designed for a variety of work, such as pulverizing the soil, cultivating plants, or cutting weeds and other growths.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of an implement embodying the invention. Fig. 2 is a side view of the implement. Fig. 3 is an end view of the rotary clod crusher and pulverizer. Fig. 4 is a detail view in perspective of the mountings for the rotary pulverizer, showing a portion of the shaft. Fig. 5 is a detail perspective view of an end portion of a toothed bar. Fig. 6 is a detail perspective view of the means for raising and lowering the front end of the main frame with the result of vertically adjusting the rotary pulverizer. Fig. 7 is a perspective view of a mower attachment. Fig. 8 is a detail view of a cultivator attachment of the disk type. Fig. 9 is a detail perspective view of the means for throwing the rotary pulverizer into and out of gear.

Corresponding and like parts are referred to in the following description and indicated in all the views of the drawings by the same reference characters.

The main frame 1 is mounted upon an axle 2 so as to turn thereon and admit of the devices fitted to the rear portion being raised or lowered. Ground wheels 3 are fitted to the end portions of the axle 2 and are adapted to be connected therewith by a ratchet mechanism to admit of one ground wheel turning faster than the other without binding, as when making a curve. The pole or tongue 4 is connected with the axle 2 in a manner not to interfere with the rotation of said axle. Braces 5 are connected at their front ends with the pole 4 and are mounted upon the axle 2 at their rear ends. Suitable means are provided between the front end of the frame 1 and the pole or tongue 4 for raising and lowering said frame to adjust the rotary pulverizer or other attachment fitted to the rear end of the frame to the required elevation. As shown most clearly in Figs. 2 and 6, a hanger 6 is pendent from the rear portion of the pole 4, and a forked lever 7 is pivoted to the lower end thereof, the fork members curving upwardly and embracing opposite sides of the pole and having spring connection with the front end of the frame 1. An operating lever 8 is connected with the rear end of the forked lever 7 and extends upwardly along one side of the pole 4 within convenient reach of the driver's seat 9. A toothed bar 10 coöperates with the lever 8 to secure it and the frame 1 in the required adjusted position.

A shaft 11 is mounted in bearings provided at the rear end of the frame, said bearings being of such construction as to admit of the shaft 11 having a limited vertical movement so as to prevent injury to the operating parts when coming in contact with a stone, root or other like obstruction. A sprocket wheel 12 is loose upon each end of the shaft 11 and a sprocket chain 13 connects it with a sprocket wheel 13$^a$, either fast to the axle 2 or to the respective ground wheels 3. A disk or head 15 is mounted upon each end portion of the shaft 11 so as to rotate therewith and supports a series of rods 16 which are mounted therein. The rods 16 may be toothed, as shown in Figs. 1, 2 and 5, or may be provided with cultivator disks 17, as indicated in Fig. 8, said disks being slipped upon the rods and held apart by means of spaced slips 18. As shown most clearly in Fig. 5, teeth 19 and 20 project from opposite sides of the rods 16, there being about twice as many teeth 20 as 19, so that the rods may be set either for fine or coarse work. Notched or toothed disks 21 are fitted to projecting ends of the rods 16 and coöperate with spring actuated pawls 22, which latter hold the rods 16 in an adjusted position so that the teeth may occupy a position about at a right angle to the surface of the ground or incline either forward or rearward according to the nature of the work, condition of soil or result to be effected. Upon turning the rods 16 to cause the teeth 19 and 20 to occupy an approximately tangential arrangement, the rotary pulverizer presents a surface consisting of longitudinal rods and short projections, or in other words, the device presents the appearance of a drum or cylinder having an open work surface to crush clods and level and pulverize the soil. One or both of the heads 15 may be easily removed, whereby provision is had for interchanging the rods 16 so as to provide either a toothed surface or a surface embodying disks 17, as will be readily understood.

When it is required to cut weeds, grass or the like, the rotary pulvizer may be replaced by the cutting mechanism illustrated in Fig. 7, the same consisting of a cutter head 23 mounted upon the shaft 11 and a cutter bar 24, the latter being attached to the main frame in any manner so as to coöperate with the cutter head 23 after the manner of the well known lawn mower.

The shaft 11, heads 15 and rods 16, with their teeth 19 and 20, or the disks 17, constitute the rotary pulverizer or clod crusher, and in some instances it may be desirable to throw the same out of gear and for this purpose levers 25 are provided and are arranged to move the sprocket wheels 12 upon the shaft 11 so as to unship the clutch 26. The levers 25 are adapted to be actuated from the driver's seat by means of a lever 27.

Having thus described the invention, what is claimed as new is:

In combination a rotary support, rods journaled at their ends in said support and provided with rows of differently spaced teeth, toothed disks fitted to the ends of said rods and pawls mounted upon the support and coöperating with the toothed disks to hold the rods in an adjusted position with rows of teeth spaced in one way out of service when differently spaced rows are put into service.

In testimony whereof I affix my signature in presence of two witnesses.

EILERT WEERTS. [L. S.]

Witnesses:
 JOHN J. CASSERLY,
 FRANK W. KNITTEL.